United States Patent Office 2,939,884
Patented June 7, 1960

2,939,884

METHOD FOR PERFORMING CHEMICAL REACTIONS, PARTICULARLY IN UNDERGROUND STORAGE CAVITIES

Allen D. Garrison, La Jolla, Calif., assignor to Texaco Inc., a corporation of Delaware No Drawing. Filed Nov. 13, 1956, Ser. No. 621,528

11 Claims. (Cl. 260—604)

The present invention relates to a novel method for preventing contact between first and second incompatible liquids of different specific gravities which are contained in a vessel, and is particularly concerned with carrying out chemical reactions in an underground storage cavern having a residual body of brine or other water solution therein which is kept from contact with the chemical reactants by the novel means of a barrier layer interposed between the water solution and the reactants.

It is a feasible to perform many types of chemical reactions in huge underground storage caverans such as may be washed out in salt and clay beds. Such caverns are particularly suited for producing changes in hydrocarbons by slow reactions carried out over a long period of time at relatively low temperatures. Examples of chemical reactions which can be so performed, and to which my invention is applicable, are the isomerization of normal paraffins, cycloparaffins, and normal olefins to the corresponding iso compounds; alkylation of an olefin having a relatively small number of carbon atoms with an isoparaffin to form hydrocarbons having a relatively large number of carbon atoms and a high octane number; the conversion of straight chain hydrocarbons to the corresponding cyclo compounds; and the polymerization of olefins. Others are hydrogenation, dehydrogenation, and oxo (reaction of CO and $H_2$ with unsaturated hydrocarbons to produce oxygenated compounds), all of which require high pressures such as can be developed easily and safely underground. Still others are the bromination, chlorination, and nitration of saturated hydrocarbons to make them reactive; and the fermentation of carbohydrates.

In accordance with the invention of the above application, such chemical reactions are safely performed over a long period of time at low cost by introducing the reactants into a cavern located deep within the earth (for example, 1,000–2,000 feet down), contacting the reactants with a catalyst effective to promote the desired chemical reaction, and maintaining the reactants in contact with the catalyst in the underground cavern for a period of time sufficient to effect the chemical reaction in a substantial amount.

It is generally unnecessary to add heat by fuel combustion because the temperature existing within the earth, for example 100–200° F. at feasible cavern depths, is sufficient for the chemical reaction over a long period of time, such as six months to two years. However, some additional heat can be added by circulating a stream of the reactants through a conventional heat exchanger at the surface before introduction into the cavern; or even after introduction a continuous circulation of all or a portion of the reactants through such a heat exchanger may be maintained. The pressure on the reactants will at least be that due to the column of liquid above the bottom of the cavern, pressures of 300–400 pounds per square inch (p.s.i.) being maintained easily, and even higher pressures up to several thousand pounds per square inch being maintained by applying pressure from the surface on the liquid column.

Separation of the converted from the unconverted material is accomplished in any suitable way, as by withdrawing the liquid material from the cavern and distilling it in a conventional manner. Unconverted material can then be returned to the cavern for conversion.

An underground cavern of the type required for performing my method advantageously is formed within a natural salt formation such as a dome or bed by first drilling a hole from the surface down into the salt formation, inserting conduits for fluid flow, and circulating water down into the formation to dissolve the salt which is then carried up to the surface as brine. For example, a cavern about 20–40 feet in diameter and about 1,000–2,000 feet in length can be formed within a salt dome located about 1,000 feet below the surface of the earth. Caverns having capacities of over 4 million gallons have been formed in this way, but both smaller and larger sizes are feasible.

A cavern similarly may be washed out of a clay bed by using a deflocculating liquid solution. Reference is made to Patent 2,803,432, issued August 20, 1957, for such a procedure.

The completed cavern is full of brine or other solution which should be removed to provide space for the chemical reactants. This can be done by forcing the lighter reactants down on the top of the brine which is thus forced up through a pipe to the surface. It is almost impossible to effect complete removal of brine so that there usually is a shallow pool of brine in the bottom of a cavern. This brine may deleteriously affect the chemical reaction by polluting the chemical reactants and by poisoning the catalyst.

In accordance with the present invention, the deleterious effect of the brine or other water solution in a cavern is counteracted by floating on its surface a barrier layer of a material which is insoluble in, and inert or unreactive with, both the brine and the chemical reactants, and which has a specific gravity intermediate such two liquids. While any barrier material having these characteristics may be employed successfully, I prefer to use a barrier layer comprising a liquid silicone polymer having a specific gravity less than 1.0. Other suitable barrier materials are flexible plastic or resinous materials dissolved in suitable solvents, for example synthetic butyl or buna rubber dissolved in a water soluble solvent such as acetone or methyl ethyl ketone; or carboxy methyl cellulose in the same solvents. The solvent eventually dissolves in the aqueous pool and a flexible non liquid impervious coating remains. Other suitable materials are methacrylate polymers such as lauryl and octyl methacrylates alone or mixed, in an oil base constituting, for example, 60% of the mixture by weight.

Typical liquid silicone polymers include condensation products of organo-silicon oxides such as those condensation products containing a plurality of silicon atoms linked through oxygen atoms, each silicon atom having attached thereto at least one organic radical. Such compounds have come to be called silicones by reason of their containing the so-called silicone radical, i.e.,

Compounds of this type may be formed by polymerization or condensation of organosilicols, the latter including mono-, di-, and trisilicols as well as various mixtures thereof.

Such compounds may be represented by the following formula:

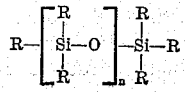

in which n is 1 or more and R represents similar or dissimilar organic radicals such as alkyl, aryl, aralkyl, alkaryl or heterocyclic groups, or the terminal R's may be substituted by hydroxyl groups, or all but one of the R's attached to the silicon atom can be substituted by hydroxyl groups or halides.

Preferably R is a single organic radical of low molecular weight such as methyl, ethyl and short chain alkyl groups. Liquid compounds having organic radicals of high molecular weight such as phenyls or compounds containing organic radicals of both high and low molecular weights can be used.

A preferred compound is the alkyl silicon dimethyl silicon polymer, having the following formula:

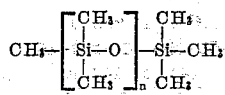

in which n is 1 or more. In most cases it is believed that the product contains a number of such polymers of different chain lengths and perhaps different chain types. Viscosity can range from as low as .65 cs. (centistokes, kinematic at 100° F.) to as high as 1,000,000 cs. with 100–1000 cs. viscosities being preferred. Specific gravities 25°/25° C. range from 0.761 to 0.973 for the 0.65 to 1,000 cs. range.

While the principles of the present invention may be applied to any type of chemical reaction performed in a vessel containing a pool of liquid, such as brine, which must be kept from contact with the reactants and catalysts, it is particularly applicable to isomerization, alkylation, cyclo conversion, polymerization, hydrogenation, and oxygenation.

In an isomerization reaction, relatively short chain light paraffin hydrocarbons such as butanes, and also the corresponding olefins, are converted to the corresponding iso compounds. The barrier material is then introduced on the top of the brine to form a layer of suitable thickness, such as one inch to six inches thick. The liquid normal hydrocarbon, such as butane, is then introduced into the storage cavern on top of the barrier layer and the pool of brine. A suitable catalyst is added to the hydrocarbon before or after introduction. Among such catalysts are aluminum chloride, hydrogen fluoride, boron trifluoride, and aluminum bromide. The reactants are then retained in the cavern for a sufficient time to effect substantial conversion to the desired iso compounds, this time sometimes being as long as six months or a year.

In alkylation, relatively short chain isoparaffin hydrocarbons are reacted with relatively short chain olefins to produce longer chain saturated isoparaffin hydrocarbons. For example isobutane and butylene can be applied on the top of the silicon and brine is a cavern in a ratio of approximately 5:1 by weight, and provided with catalyst such as boron trifluoride or a boron trifluoride-hydrogen trifluoride mixture. The reaction mixture is then allowed to remain in the cavern until the reaction has occurred. If desired, the alkylation can proceed with n-butane instead of isobutane by using a catalyst which is active for both isomerization and alkylation, for example aluminum chloride and bromide, concentrated sulfuric acid, boron trifluoride, hydrogen trifluoride-boron trifluoride, and potassium hydrogen fluoride.

In cyclo conversion straight chain hydrocarbons such as n-butane or n-hexane are converted to the corresponding cyclo compounds on top of the silicon layer. Suitable catalysts are platinum, nickel and cobalt.

In polymerization, unsaturated aliphatic hydrocarbons such as ethylene, propylene and butylene are polymerized on top of a silicone layer with a catalyst such as hydrated phosphoric acid, or with a silica-alumina base impregnated with the oxides group V of the periodic table.

In hydrogenation a material such as crude oil, naphtha, or Diesel fuel is introduced into a cavern on top of a silicone layer and treated with hydrogen in the presence of a catalyst such as cobalt molybdate, nickel-tungsten sulfide, or nickel.

In oxygenation (Oxo) a cobalt carbonyl catalyst is dissolved in an olefin such as ethylene or propylene which is introduced into a cavern on top of a silicone layer. Gaseous hydrogen and carbon monoxide in ratios of 1:1 by volume are then pumped down into the cavern to effect reaction.

*Example*

A storage cavern roughly 20 feet in diameter and 500 feet long located 1,000 feet below the surce, within a salt dome, contains a pool of residual brine three feet deep. Into this cavern there is introduced 605 pounds of liquid dimethyl silicone of 100 cs. kinematic viscosity to provide a barrier layer three inches thick floating on the top of the brine pool. The brine has a specific gravity of 1.197 20°/4° C. and the 100 cs. silicone has a specific gravity of 0.968 so that it floats readily on the top of the brine.

The rest of the cavity is then substantially filled with liquid butane having a density of 0.601 at 0° C. so that it floats upon the silicone layer and is effectively separated from contact with the brine. Hydrogen trifluoride-boron trifluoride catalyst is then introduced into the butane and distributed uniformly therein.

After six months' storage in the cavern the upper layer is removed by pumping in brine to displace the upper layer while the floating silicone barrier also rises to maintain separation of the phases. The isobutane is then separated from the normal butane by distillation.

It is evident that the principles of the present invention are primarily applicable to conducting chemical reactions in vessels such as huge underground storage caverns as described above. However, it should be clearly understood that they also apply in any situation where it is necessary to prevent contact between two incompatible liquids of different specific gravities contained in a vessel of any type, whether on a laboratory scale or in a plant size reactor.

Obviously, many modifications and variations of the invention, as hereinbefore set forth, may be made without departing from the spirit and scope thereof, and therefore only such limitations should be imposed as are indicated in the appended claims.

I claim:

1. A method for conducting a catalytic chemical reaction in an underground storage cavern located in an earth formation and containing a pool of liquid comprising water, said method comprising maintaining in said cavern on the top of said pool a floating layer of an inert barrier material having a specific gravity less than said first named liquid, and maintaining on the top of said layer of inert barrier material a reactant liquid chemical having a catalyst associated therewith and having a specific gravity less than said inert barrier material, said layer spacing said liquids vertically from one another.

2. A method in accordance with claim 1 wherein said reactant liquid chemical is a normal hydrocarbon, and said catalyst is an isomerization catalyst.

3. A method in accordance with claim 1 wherein said reactant liquid is a cycloparaffin hydrocarbon, and said catalyst is an isomerization catalyst.

4. A method in accordance with claim 1, wherein said reactant liquid is a paraffin hydrocarbon, and said catalyst is effective to convert said paraffin hydrocarbon to the corresponding cycloparaffin.

5. A method in accordance with claim 1 wherein said reactant liquid is a mixture of an isoparaffin hydrocarbon and an olefin hydrocarbon, and said catalyst is an alkylation catalyst.

6. A method in accordance with claim 1 wherein said reactant liquid is an olefin hydrocarbon, and said catalyst is a polymerization catalyst.

7. A method in accordance with claim 1 wherein said reactant liquid is an olefin and said catalyst is an oxygenation catalyst, said method also comprising introducing hydrogen and carbon monoxide into contact with said olefin in said cavern.

8. A method in accordance with claim 1 wherein said earth formation is salt, said pool is brine, and said inert barrier material is a liquid silicone.

9. A method in accordance with claim 1 wherein said floating layer of an inert barrier material is also a liquid.

10. A method in accordance with claim 1 wherein said earth formation is salt and said pool is brine.

11. A method for conducting a catalytic chemical reaction in an underground storage cavern located in an earth formation and containing a pool of liquid comprising water, said method comprising first introducing and maintaining in said cavern on the top of said pool a floating layer of an inert barrier material having a specific gravity less than said first named liquid, and subsequently introducing and maintaining on the top of said floating layer of inert barrier material a reactant liquid chemical having a catalyst associated therewith and having a specific gravity less than said inert barrier material.

References Cited in the file of this patent

UNITED STATES PATENTS

| | | |
|---|---|---|
| 2,104,488 | Kennedy et al. | Jan. 4, 1938 |
| 2,265,962 | Bent et al. | Dec. 9, 1941 |
| 2,330,079 | Owen | Sept. 21, 1943 |
| 2,382,471 | Frey | Aug. 14, 1945 |
| 2,383,123 | Gorin | Aug. 21, 1945 |
| 2,423,674 | Agren | July 8, 1947 |
| 2,677,666 | Dougherty | May 4, 1954 |
| 2,722,277 | Crawford | Nov. 1, 1955 |
| 2,729,549 | Reman et al. | Jan. 3, 1956 |

FOREIGN PATENTS

| | | |
|---|---|---|
| 131,131 | Australia | Jan. 24, 1949 |